April 19, 1960   F. P. QUINN ET AL   2,933,200
COMBINED RUBBER AND FRICTION SHOCK ABSORBING
MECHANISM FOR RAILWAY CARS
Filed Nov. 9, 1956   2 Sheets-Sheet 1
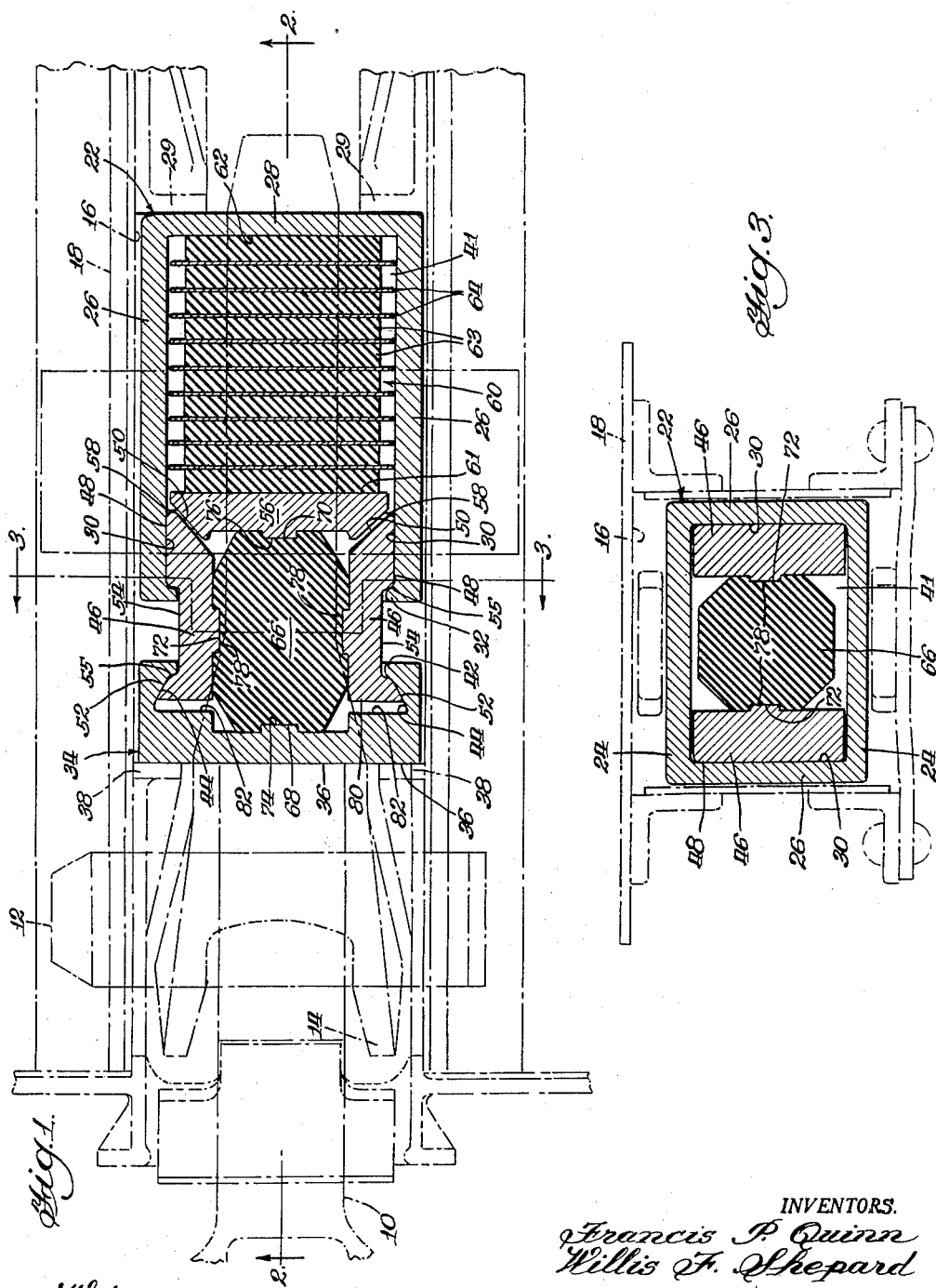
INVENTORS.
Francis P. Quinn
Willis F. Shepard
By Walter S. Schlegel, Jr. Atty.
Witness:
Richard W. Carpenter April 19, 1960     F. P. QUINN ET AL     2,933,200
COMBINED RUBBER AND FRICTION SHOCK ABSORBING
MECHANISM FOR RAILWAY CARS
Filed Nov. 9, 1956     2 Sheets-Sheet 2
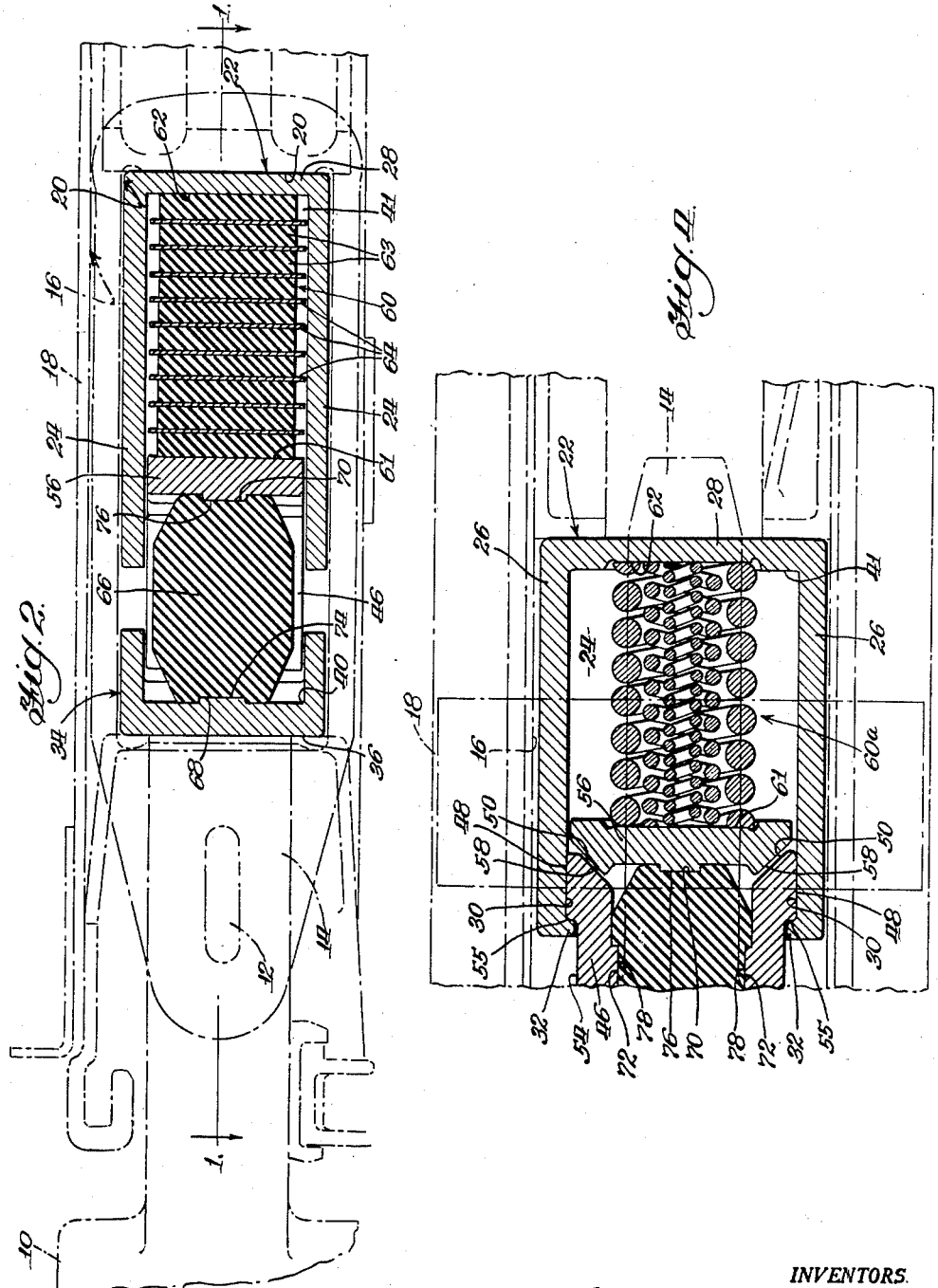
INVENTORS.
Francis P. Quinn
Willis F. Shepard
By Walter S. Schlegel, Jr. Atty.
Witness
Richard W. Carpenter United States Patent Office 2,933,200
Patented Apr. 19, 1960

2,933,200

COMBINED RUBBER AND FRICTION SHOCK ABSORBING MECHANISM FOR RAILWAY CARS

Francis P. Quinn, Deerfield, and Willis F. Shepard, Granite City, Ill., assignors to American Steel Foundries, Chicago, Ill., a corporation of New Jersey Application November 9, 1956, Serial No. 621,347

19 Claims. (Cl. 213—22)

This invention relates to shock absorbing mechanisms of the type generally employed in draft gear arrangements for railway cars.

The invention comprehends a shock absorbing device wherein shocks are absorbed by means of both frictional resistance and compression of resilient means.

Under normal operating conditions, railway draft gear mechanisms are subjected to impacts of varying degrees of force or magnitude. For this reason, the shock absorbing devices employed therein, in order to perform completely satisfactorily, must be adapted to absorb shocks from, or yieldingly resist, comparatively heavy as well as comparatively light impacts. Because conventional draft gear shock absorbing mechanisms have seldom proven versatile enough to react properly to impacts of varying force, many attempts have been made to produce a shock absorbing mechanism capable of cushioning impacts of all degrees of force.

It is therefore a primary object of this invention to provide an improved shock absorbing device for railway draft gear appliances which is adapted to react uniformly to impacts of varying force or magnitude.

Another object is to provide an improved shock absorbing device having separate sets of spring means with varying shock absorbing capacities.

Another object is to provide an improved shock absorbing device having friction means capable of damping the longitudinal oscillations of the spring means.

Another object is the provision of a shock absorbing mechanism for draft gears having a minimum number of parts and which may be readily assembled and disassembled.

A further object of the invention is to provide a shock absorbing device having both resilient means and friction means to resist and cushion shocks.

Yet another object of the invention to to provide a shock absorbing device including a plurality of friction shoes telescopically disposed in interlocking engagement with a friction housing and a follower cap.

A more specific object of the invention is the provision of a shock absorbing device having a solid resilient block adapted to cushion light impacts and a plurality of resilient mats adapted to cushion the heavy impacts.

These and other objects of the invention will be apparent from an examination of the following description and drawings, wherein:

Figure 1 is a fragmentary top plan view, partly in horizontal section taken on line 1—1 of Figure 2, of a draft gear arrangement embodying features of my invention;

Figure 2 is a fragmentary side view of the same, partly in vertical section taken on line 2—2 of Figure 1;

Figure 3 is a fragmentary end view of the same, partly in vertical section taken on line 3—3 of Figure 1, and Figure 4 is a fragmentary view similar to Figure 1, but illustrating a modified form of my invention.

It will be understood that certain elements have been intentionally omitted from certain views of the drawings where they are believed to be illustrated more clearly in other views.

Referring now to the drawings for a better understanding of the invention, it will be seen that the novel shock absorbing device is shown as applied to a coupler and draft gear arrangement including a coupler 10 secured as by a key 12 to a yoke 14, the yoke being disposed in a draft gear pocket 16 presented by a car body sill 18. The shock absorbing mechanism is disposed in a cavity 20 of the yoke 14.

As best seen in Figure 1, the shock absorbing mechanism comprises a housing indicated generally at 22 having generally parallel top and bottom walls 24 and side walls 26 interconnected at the rearward end of the housing by a preferably intergral base or end wall 28 engageable with draft gear pocket rear stop lugs 29.

Side walls 26 of the housing present at the forward end of the housing a pair of opposed inner friction surfaces 30. At the extreme forward ends of the side walls are presented internally extending locking lugs 32, the purpose of which is hereinafter explained.

Disposed forwardly of and spaced a short distance from the housing 22 is a front follower or follower cap 34. The follower cap presents a flat forward surface 36 engageable with draft gear pocket forward stop lugs 38. The rearward end of the follower cap 34 presents a cavity 40 facing the open end of the cavity 41 of the housing. The cap also presents inwardly extending locking lugs 42 having inwardly facing wedge surfaces 44.

A pair of generally elongated friction shoes 46 are slidingly telescoped within the cap and housing and present on their rearward ends outer friction surfaces 48, engageable with the friction surfaces 30 of the housing, and inner wedge surfaces 50. At their forward ends the shoes present outer wedge surfaces 52 engageable with the inner wedge surfaces 44 of the follower cap. If desired, the surfaces 52 and 44 may converge in the opposite direction to that shown in Figure 1 or may extend approximately parallel to the longitudinal axis of the housing 22. The outer surfaces of the shoes 46 present recesses or grooves 54 in which are disposed the locking lugs 32 and 42 of the housing and cap, respectively, the lugs serving to limit the movement of the housing and cap away from each other by engagement with shoulders 55 of the shoes.

A substantially rectangular wedge block or rear follower 56 is disposed within the housing cavity 41 rearwardly adjacent the rearward portion of the shoes 46 and presents a pair of wedge surfaces 58 engageable with the rearward wedge surfaces 50 of the shoes.

A set of primary springs or primary resilient means indicated generally at 60 is disposed within the housing cavity 41 in abutting engagement with the rear surface 61 of the rear follower 56 and the forward surface 62 of the housing rear wall 28. The primary spring means 60 preferably comprises a plurality of resilient mats 63 preferably formed of rubber disposed alternately with a plurality of flat thin preferably metal plates or spacers 64.

A secondary spring means 66 preferably comprising a solid resilient block, preferably rubber, is disposed between the front and rear followers and the friction shoes. The block 66 may be provided at its forward and rearward ends and on its sides with recesses 68, 70 and 72 in which are seated bosses 74, 76 and 78 presented by the front and rear followers and shoes, respectively, to retain the block in proper relationship to the followers and shoes at all times.

As best seen in Figure 1, the rubber block is so arranged and disposed that when in its normal noncompressed condition there is a slight amount of clearance between the related wedge surfaces 50 and 58 of the friction shoe and rear follower, respectively, and between the related forward surfaces 80 of the shoes and the rear surfaces 82 of the front follower.

To assemble the gear, the rubber mats and spacers are first placed in the housing. The friction elements are then assembled and compressed until the over-all distance between the friction blocks is less than the distance between the locking lugs inside the cap and housing. The friction elements are then clamped in compressed condition and inserted into the housing against the rear follower block. The cap is then placed on top of the assembly and the complete part is pressed together until the rubber block is compressed so the clamp may be removed. The compression load is continued until the locking lugs of the follower cap and housing are engaged in the friction shoe grooves 54. After the compression load is released the energy stored in the springs will restore the gear to its normal free height.

It will be understood that following removal of the compression load, the rubber block will return to an inactive but pre-compressed condition. The rubber block will exert sufficient force against the mats 63, through the rear follower 56, to retain the clearance between the related wedge surfaces 50 and 58 of the friction shoe and rear follower, respectively. In operation, it will be understood that light impacts imparted to the draft gear, and particularly to the shock absorbing mechanism, will be cushioned by the rubber block 66 while the heavier impacts will be taken partially through the block 66 but primarily through the primary spring means 60. The energy stored in the rubber will be absorbed through the friction device and the frictional engagement between the shoes and the inner surface of the housing will serve to damp the longitudinal oscillation of the spring means. The provision of the clearance between the shoes and the front and rear followers will result in a smooth soft action in the block in absorbing the light impacts resulting from the usual running in and out of slack in the usual train operations. The heavy impacts resulting from heavy braking or coupling will be absorbed by all of the resilient means. In these cases, the impacts will drive the cap solid against the friction shoes and the shoes against the rear follower thus bringing the rubber mats into use. The wedging engagement between the friction shoes and the rear follower will force the shoes against the friction surfaces of the housing to offer additional frictional resistance to the impact exerted on the housing.

Another form of my invention is illustrated in Figure 4 of the drawings. This arrangement is essentially the same as that previously described except that in place of the mats and spacers, we have substituted a set of conventional metal compression springs 60a for the rubber mats and spacers 63 and 64 illustrated in Figure 2 of the drawings.

It will also be understood that the frictional engagement between surfaces 44 and 52 of the front follower and friction shoes, repectively, will serve to dampen movement of the outer follower as pressure on the unit is released.

We claim:

1. In a shock absorbing device, a housing closed at its rearward end and open at its forward end, said housing having inwardly extending lugs disposed adjacent the open end thereof, a plurality of resilient mats disposed in the housing in abutting engagement with the closed end thereof, a follower plate disposed in said housing in abutting engagement with said mats and presenting forwardly sloping wedge surfaces, a front follower cap disposed adjacent the forward end of the housing, said cap being closed at its forward end and open at its rearward end and presenting inwardly extending lugs disposed adjacent the open end thereof, a plurality of friction shoes disposed to frictionally engage internal friction surfaces presented by the housing and the wedge surfaces of the follower plate and having interlocking engagement with the respective lugs of the housing and follower cap, and a resilient block interposed between the follower cap, follower plate, and the friction shoes.

2. In a shock absorbing device, a housing presenting internal friction surfaces and having inwardly extending lugs disposed adjacent an open end thereof, spring means disposed in the housing, a wedge block disposed in the housing adjacent the spring means, a follower cap having an open end disposed adjacent the open end of the housing and having inwardly extending lugs disposed adjacent its open end, a plurality of friction shoes slidingly telescoped within the cap and housing and presenting friction and wedge surfaces engaging the friction and wedge surfaces of the housing and wedge block, respectively, said shoes being disposed in interlocking engagement with the lugs of the cap and housing, and other spring means disposed between the cap, wedge block, and friction shoes.

3. In a shock absorbing device, a housing having a closed end, an open end, and inner friction surfaces, a follower cap spaced from and in alignment with said open end of the housing, a plurality of friction shoes slidingly telescoped within the housing and the cap in frictional engagement with said surfaces, spring means disposed within the housing in abutting engagement with said closed end of the housing, a wedge block disposed between the spring means and the friction shoes in abutting engagement with the former and in wedging engagement with the latter, and other spring means positioned between and abuttably engaging the cap, wedge block, and friction shoes.

4. A shock absorbing device according to claim 3, wherein the first mentioned spring means comprises a plurality of resilient pads compressibly interposed between the wedge block and the closed end of the housing, and wherein the second mentioned spring means comprises a solid resilient block compressibly interposed between the cap, wedge block, and friction shoes.

5. In a shock absorbing device, a housing presenting inner friction surfaces, primary spring means disposed within the housing in engagement with a closed end thereof, a follower cap having an open end disposed adjacent and facing an open end of the housing, a plurality of friction shoes slidingly telescoped within the cap and housing and frictionally engaging said surfaces, a wedge block disposed in the housing between the primary spring means and the shoes, said wedge block being engaged on one side thereof by said primary spring means and having wedging engagement with the shoes, and secondary spring means disposed between the cap, block, and shoes, said secondary spring means engaging the wedge block on the other side thereof, said primary spring means having greater shock absorbing capacity than said secondary spring means.

6. In a shock absorber, spaced housings, friction shoes, each frictionally and slidably engageable with the interior surfaces of both housings, wedge follower means in one housing presenting wedge surfaces for wedge engagement with the shoes, and a pair of compression spring means disposed in longitudinal alignment with each other and being separated from each other by the wedge follower means, said spring means being compressibly interposed between said wedge follower means and the walls of the respective housings, one of said spring means comprising a flowable mass of resilient material compressibly interposed between the shoes so that as the housings are urged toward each other by an external force, said mass will be compressed axially and expanded radially to thereby urge the shoes into frictional engagement with said surfaces.

7. In a shock absorbing device, a housing presenting inner friction surfaces, a follower cap disposed adjacent said housing, a plurality of friction shoes slidingly telescoped within the cap and housing in frictional engagement with said surfaces, a wedge element disposed within the housing in wedging engagement with the shoes, primary resilient means disposed within the housing and engaging the wedge element and the housing, and secondary resilient means engaging the cap, wedge element, and shoes, said primary resilient means having greater shock absorbing capacity than said secondary resilient means.

8. In a shock absorbing device, a housing presenting inner friction surfaces, a plurality of friction shoes slidingly telescoped partially within the housing and frictionally engaging said surfaces, front and rear followers disposed at opposite ends of and having wedging engagement with opposite ends of said shoes, primary spring means reacting between and abuttably engaging one of said followers and said housing, and secondary spring means reacting between and abuttably engaging the followers, said shoes having interlocking engagement with the housing and the other of said followers.

9. In a shock absorbing device, a housing open at one end and presenting inner friction surfaces, a follower cap disposed adjacent the open end of the housing, a plurality of friction shoes slidingly telescoped partially within the cap and housing in frictional engagement with said surfaces, wedge means disposed within the housing in wedging engagement with the shoes, and separate spring means disposed on opposite sides of the wedge means and reacting between the wedge means and the cap and between the wedge means and housing, respectively.

10. In a shock absorbing device, a housing presenting inner friction surfaces, a follower cap disposed adjacent the housing, a plurality of friction shoes telescopically disposed within said cap and housing in interlocking engagement therewith and frictionally engaging said surfaces, a rear follower wedge disposed within the housing and wedgingly engageable with the shoes, primary spring means reacting between the follower wedge and housing, and secondary spring means reacting between the respective followers, said secondary spring means, in release position, serving to maintain said shoes in spaced relationship to said follower cap and follower wedge, said secondary spring means having lesser shock absorbing capacity than said primary spring means.

11. In a shock absorbing device, a housing presenting inner friction surfaces, front and rear followers spaced from each other, said rear follower being disposed within the housing, primary resilient means disposed within the housing and reacting between said rear follower and the housing, secondary resilient means reacting between the respective followers, and a plurality of friction shoes telescopically disposed within the housing and front follower in frictional engagement with said surfaces and having wedge-like engagement with the respective followers, said rear follower being disposed to extend between the shoes, and the front follower being disposed to surround said shoes.

12. In a shock absorbing device, a housing presenting inner friction surfaces, a plurality of friction shoes telescopically disposed partially within the housing and frictionally engaging said surfaces, wedge means disposed within the housing inwardly of the shoes and engageable with wedge surfaces presented by the inner ends of said shoes, a follower cap disposed to contain the outer ends of said shoes, primary spring means in the housing interposed between and abuttably engaging the wedge means and the housing, and secondary spring means interposed between and abuttably engaging the cap and the wedge means, said primary spring means having greater shock absorbing capacity than said secondary spring means.

13. A shock absorbing device according to claim 12, wherein said shoes are in interlocking engagement with said housing and said cap.

14. In a shock absorbing device, a housing member and a follower cap member having open ends disposed adjacent but spaced from each other, a plurality of friction shoes telescopically disposed within the respective members in interlocking engagement therewith, a wedge element disposed within the housing and adapted to urge said shoes into frictional engagement with the housing, spring means disposed to react between and engage the wedge element and the housing, and other spring means disposed to react between and engage the cap member and the wedge element.

15. In a shock absorbing device, a housing, a cap, friction shoes telescopically interposed within the cap and housing and frictionally engageable with the housing, said shoes presenting spaced abutment means engageable with abutment means on the cap and on the housing, respectively, to afford interlocking engagement between the shoes and the cap and housing, wedge means in the housing engageable with the shoes, and a pair of spring means disposed, respectively, on opposite sides of and in engagement with said wedge means, one of said spring means comprising a resilient mass compressible against the shoes to urge them into frictional engagement with the housing.

16. In a shock absorbing device, a housing, a rear follower disposed within the housing and comprising wedge surfaces converging forwardly, a front follower disposed without the housing and comprising wedge surfaces, friction shoes disposed partially within the housing and partially within the front follower, said shoes having interlocking engagement with the housing and front follower so as to be the sole means of interconnecting the housing and the front follower, said shoes presenting wedge surfaces adjacent opposite ends thereof engageable with the wedge surfaces of the front and rear followers, respectively, and spring means reacting against at least one of the followers to urge the shoes into frictional engagement with the housing.

17. A shock absorbing device according to claim 3, wherein the housing and cap are provided with inwardly extending lugs, and wherein the shoes comprise recesses spaced from their ends and receiving said lugs to limit relative movement of the cap and housing away from each other.

18. A shock absorbing device according to claim 5, wherein the cap and housing comprise inwardly projecting lugs at their open ends, and wherein the shoes comprise recesses receiving said lugs and defined by shoulders engageable with said lugs to limit movement of the cap and follower away from each other.

19. In a shock absorbing device, a housing, a wedge block therein, spring means engaging one side thereof, other spring means of lesser capacity than first mentioned spring means engaging the opposite side of said wedge block, friction shoes presenting at corresponding inner ends thereof wedge and friction surfaces engageable with said wedge block and housing, respectively, corresponding outer ends of said shoes projecting outwardly from said housing and presenting surfaces, another housing containing portions of said outer ends of said shoes and presenting surfaces engageable with said surfaces of the outer ends of said shoes, said other spring means being compressibly interposed between said wedge block, said shoes, and said other housing to yieldingly resist movement of the housings toward each other and to urge said shoes into engagement with said housings, said shoes having adjacent said corresponding ends thereof abutment means engageable with abutment means on the respective housings operable to interconnect said housings.

References Cited in the file of this patent

UNITED STATES PATENTS

| 1,323,787 | Richards et al. | Dec. 2, 1919 |
| 2,263,599 | Tucker | Nov. 25, 1941 |
| 2,410,933 | Freeman | Nov. 12, 1946 |
| 2,687,219 | Danielson et al. | Aug. 24, 1954 |
| 2,733,915 | Dentler | Feb. 7, 1956 |